United States Patent [19]

Hamamura et al.

[11] Patent Number: 4,848,692
[45] Date of Patent: Jul. 18, 1989

[54] APPARATUS FOR FITTING ROTARY

[75] Inventors: Fumio Hamamura, Kanagawa; Noriyasu Sawada, Saitama; Ichio Fukuda, Tokyo, all of Japan

[73] Assignee: Somar Corporation, Tokyo, Japan

[21] Appl. No.: 935,496

[22] Filed: Nov. 26, 1986

[30] Foreign Application Priority Data

Nov. 26, 1985 [JP] Japan .................. 60-266477

[51] Int. Cl.$^4$ .............. B65H 16/04; B23B 25/00; F16D 1/06
[52] U.S. Cl. ................. 242/68.3; 242/68.4; 242/72 R; 279/2 R; 403/366
[58] Field of Search ............ 242/68.4, 72 R; 403/362, 366, 287; 279/2 R, 8

[56] References Cited

U.S. PATENT DOCUMENTS

| | | |
|---|---|---|
| 3,027,285 | 3/1962 | Eisner et al. |
| 3,367,225 | 2/1968 | Stanford et al. |
| 3,404,057 | 10/1968 | Heiart |
| 3,463,520 | 8/1969 | Turro .................. 403/362 |
| 3,598,432 | 8/1971 | Walker ................. 403/366 |
| 3,626,506 | 12/1971 | Spleth ................. 403/366 X |
| 3,743,203 | 7/1973 | Rancourt .............. 242/68.4 |
| 4,045,038 | 8/1977 | Oben Shain ........... 242/68.4 X |
| 4,238,979 | 12/1980 | Jines ................. 279/2 R X |
| 4,514,109 | 4/1985 | McKenna . |

FOREIGN PATENT DOCUMENTS 137669 1/1902 Fed. Rep. of Germany .
6505 10/1912 Switzerland .

Primary Examiner—Stuart S. Levy
Assistant Examiner—Steven M. duBois
Attorney, Agent, or Firm—Sughrue, Mion, Zinn, Macpeak & Seas

[57] ABSTRACT

A device for fixing a roller to a rotary shaft, particularly useful with supply and take-up rollers in a laminator device for printed circuit boards, in which only a single tightening operation is required to fix the roller to the shaft. A support member and a press member when assembled together fit inside an end of the roller. A manually rotatable screw threaded to the press member passes through a hole in the support and presses against a sleeve through which the shaft passes and which is press-fitted inside the support member. Guide plates hold the support member and press member in place.

25 Claims, 5 Drawing Sheets

APPARATUS FOR FITTING ROTARY

BACKGROUND OF THE INVENTION

The present invention relates to a device for fixing a roller to a rotary shaft, and also a roller having such a fixing device. Specifically, the invention relates to such a roller used as a winding or take-up roller in an apparatus such as a printed circuit board laminator.

Printed circuit boards for use in electronic equipment such as computers are commonly manufactured by a process such as the following: An insulating base is covered with an electrically conductive layer. The electrically conductive layer is then covered with a laminate composed of a photosensitive resin layer (photoresist layer) and a translucent resin film (protective layer) by thermocompression bonding. Next the photosensitive layer is exposed through a photographic mask formed in the desired wiring pattern for a suitable length of time. The translucent film is peeled off and the photosensitive layer developed to form an etching mask. The unwanted portions of the conductive layer are removed by etching. The desired printed circuit board results after the material of the etching mask is removed.

The laminate used in the above process is supplied from a continuous web wound on a supply roller in the laminator apparatus. The web is three-layered, being composed of the above-mentioned translucent resin film, the photosensitive resin layer, and a second translucent resin film. The second translucent film is peeled away prior to the laminate reaching the stage where it is adhered to the electrically conductive layer and wound onto a take-up roller.

The supply roller includes a tubular core attached to a rotating shaft through a fixing device including two screw members installed independently of each other. However, the conventional arrangement is disadvantageous in that much labor is required to fasten the two screw members.

SUMMARY OF THE INVENTION

Accordingly, it is an object of the present invention to provide a device for fixing a roller to a rotating shaft and such a roller which does not require the fastening of two separate screw members.

The above, as well as other objects of the invention, are met by the provision of a device for fixing a roller to a rotary shaft including a support member having a first hole through which the shaft passes, a press member, the support member and the press member being dimensioned so that when assembled together they are received in a hollow end portion of the roller, a screw threadedly fitted to the press member and passing through a second hole in the support member extending orthogonal to the first hole and into a recess formed around the shaft, a sleeve received in the recess and positioned around the shaft, the sleeve having an inner diameter larger than an outer diameter of the shaft where the shaft passes through the sleeve and an outer diameter less than an inner diameter of the recess, and a first guide plate fixed to an outer end of the support and a second guide plate fixed to the roller for guiding the press member. In this structure, when the screw is tightened, said support member and the press member are moved apart to firmly engage an inner surface of the roller in the hollow end portion while simultaneously an end of the screw engages the shaft. The invention also provides a supply roller and a take-up roller which employ this fixing device.

DETAILED DESCRIPTION OF THE PREFERRED EMBODIMENTS

Figure 1:
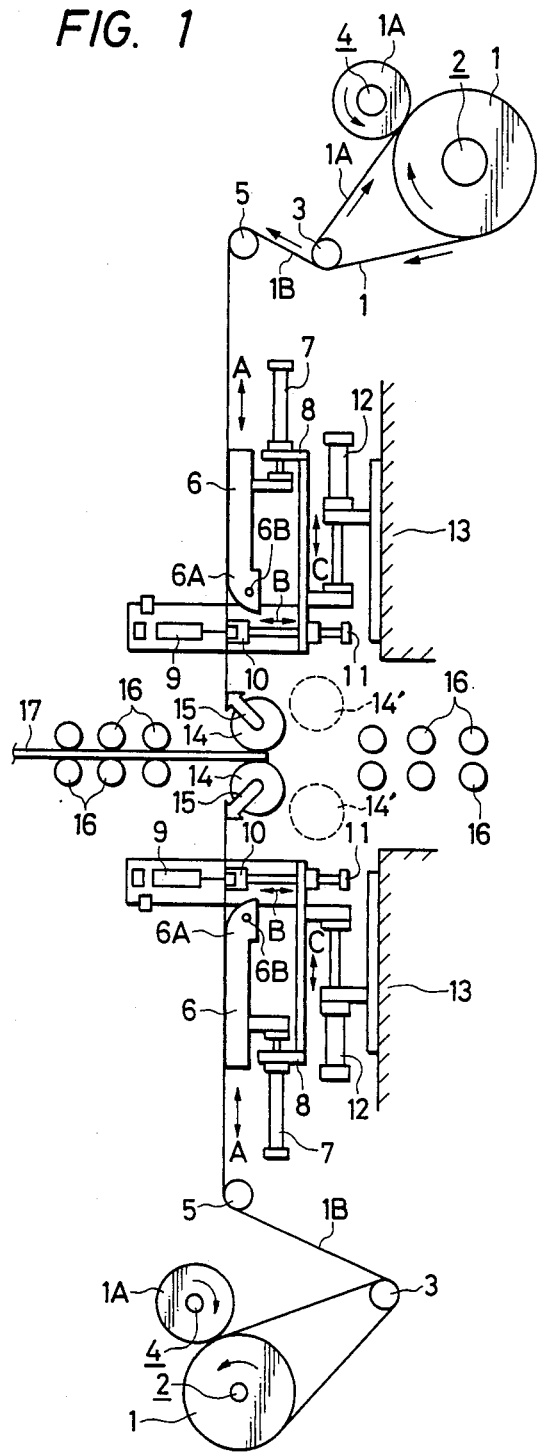
FIG. 1 is a schematic view of a film laminator device in which fixing devices and rollers of the invention are advantageously employed.

First, a printed circuit board laminator apparatus in which fixing devices and rollers constructed according to the invention are used to advantage will be described with reference to FIG. 1. Like reference numerals and characters indicate common elements throughout the following description.

FIG. 1 is a schematic representation of a printed circuit board laminator. The laminator is constructed symmetrically with respect to the two sides of the printed circuit board so that printed circuit patterns can be simultaneously formed on the two sides of the board. Since the two halves of the laminator are identical, only the upper half will be described.

A supply of a three-layer web 1 composed of a laminate of a first translucent film and photosensitive layer 1A and a second translucent film 1B is wound on supply roller 2. As the web is wound off the roller 2, the second translucent film 1B is separated from the remaining laminate 1A by a peeling roller 3 and wound onto a take-up roller 4.

The invention is most closely concerned with the structure of the two rollers 2 and 4. However, for completeness, a description will be given of the remainder of the overall apparatus.

The laminate 1B is fed towards the printed circuit board via a tension roller 5. The leading end of the laminate 1B is held pulled towards a main vacuum plate 6 by suction as to apply an appropriate tension to the laminate 1B. The main vacuum plate 6 is supported by a frame 8 through an air cylinder 7 so that the position of the vacuum plate 6 can be adjusted in the direction indicated in the drawing by a double-headed arrow A. The action of the tension roller 5 and the main vacuum plate 6 prevents the laminate 1B from creasing. An arcuate portion 6A at the front end of the main vacuum plate 6 contains a heater 6B used to heat the leading end of the laminate 1B to cause it to temporarily adhere to the conductive layer.

A rotary cutter 9, provided close to the arcuate portion 6A, cuts the laminate 1B to the appropriate size corresponding to that of the insulating base of the circuit board. A subsidiary vacuum plate 10, used for causing the leading end of the laminate 1B to be drawn toward the arcuate portion 6A, is installed opposite the rotary cutter 9. The sub vacuum plate 10 is supported by the frame 8 via an air cylinder 11 so that the position of the sub vacuum plate 10 is adjustable in the direction indicated in the drawing by a double-headed arrow B. The frame 8 supporting the main and subsidiary vacuum plates 6 and 10 is supported by a frame 13 of the apparatus body through an air cylinder 12 so that the position of the frame 8 can be adjusted in the direction of a double-headed arrow C.

The leading end of the laminate 1B is pressed against the conductive layer of the circuit board and made to temporarily adhere thereto by the action of a bonding roller 14. The trailing end of the laminate 1B is then cut by the cutter 9 at the appropriate point. Guided by a triangular rotary vacuum plate 15, the cut laminate 1B is then pressed onto the conductive layer and bonded thereto by thermocompression by action of the bonding roller 14.

The structures of the rollers 2 and 4 will now be described with reference to FIGS. 2 through 6.

A supply roller fixing device 2A is used to mount the supply roller 2 to a rotary shaft 2B. Specifically, in the fixing device 2A a manually turnable screw 2Ad is threadedly fitted in a press member 2Af, the latter having a radially extending portion 2Ai abutting an inner surface of the end of the hollow cylindrical roller 2. Remaining portions of the end of roller 2 are filled by a support 2Aj through which the end 2Aa of the shaft 2B passes. A hole 2Ab is formed in the support around the end 2Aa of the shaft 2B. A sleeve 2Ac, having an inner diameter less than the outer diameter of the end 2Aa of the shaft 2B and a nominal outer diameter larger than the diameter of the hole 2Ab is press-fitted in the hole 2Ab. Guide plates 2Ag and 2Ah hold together the assembly of the press member 2Af, support 2Aj and sleeve 2Ac. The guide plate 2Ag has a cylindrical portion which penetrates the hole 2Ab and restrains movement of the sleeve 2Ac.

The supply roller 2A and press member 2Af are preferably made of a material such as resin or aluminum alloy, while the screw 2Ad, sleeve 2Ac and guide plates 2Ag and 2Ah are made of steel or a steel alloy.

Figure 6:
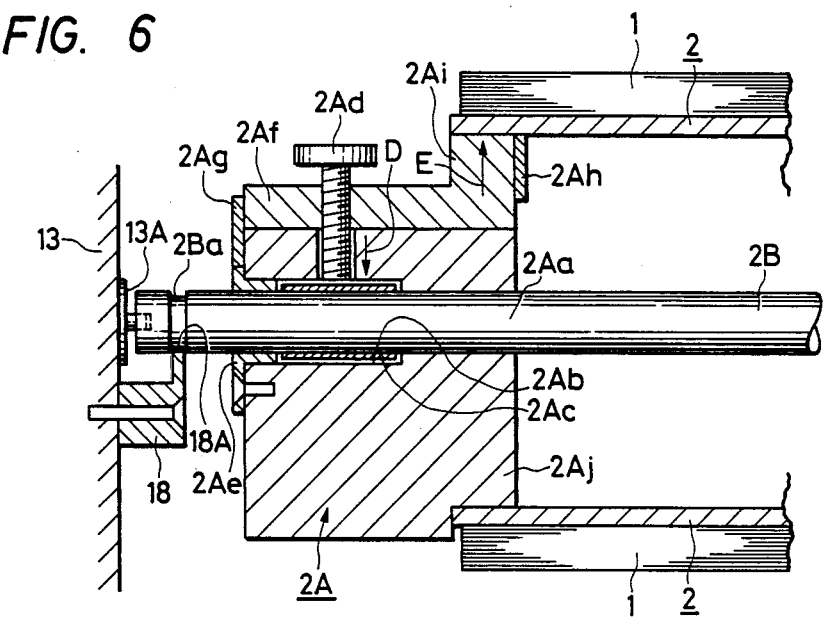
FIG. 6 is a cross-sectional view of a portion of the supply roller of FIG. 3.
Figure 7:
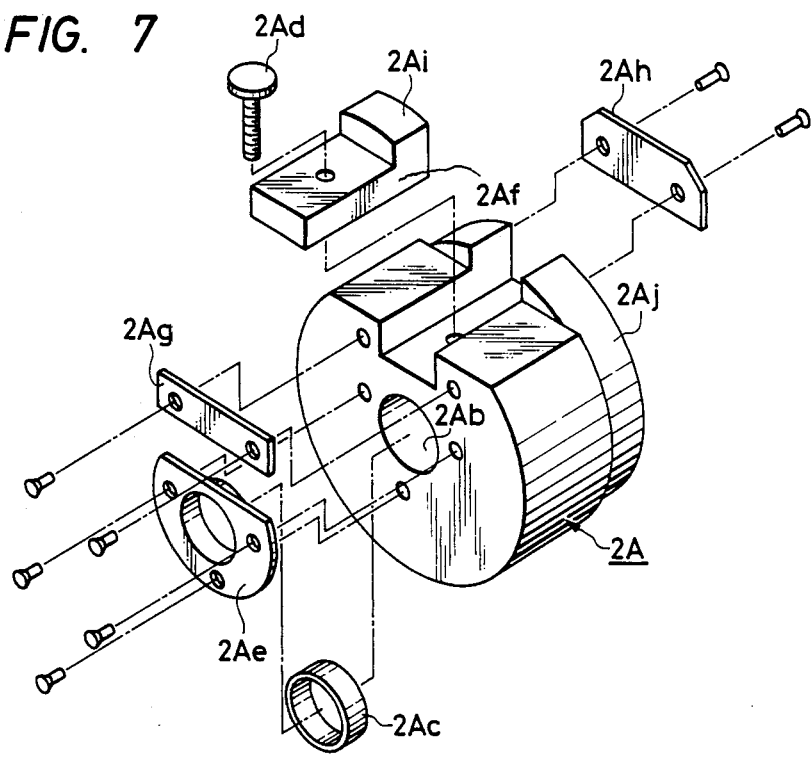
FIG. 7 is an expanded disassembled view of a fixing device of the invention used with the rollers of FIGS. 2 and 3.

When the screw 2Ad is tightened to turn it in the direction of the arrow D in FIG. 6 and press the end of the screw 2Ad against the outer surface of the sleeve 2Ac, the radially extending portion 2Ac the press member 2Af is pushed against the inner surface of the roller 2 (in the direction of the arrow E) while the opposite surface of the support 2Aj is pressed against the inner surface of the roller 2 in the opposite direction, thereby firmly clamping the cylinder 2 to the shaft 2B with only a single tightening operation.

That is, after the screw 2Ad engages the sleeve 2Ac and is then further extended radially inwardly, the press member 2Af is necessarily displaced radially outwardly from the sleeve 2Ac and the shaft 2B. However, the support 2Aj cannot significantly move radially relative to the shaft 2B because of the press fit between the two provided by the sleeve 2Ac. Therefore, the press member 2Af separates from the support 2Aj and the effective diameter of the press member 2Af and the support 2A is increased so both engage diametrically opposed portions of the inner surface of the roller 2.

The shaft 2B has formed at its end region a guide groove 2Ba. A support 18 is fixed to the frame 13. The support 18 has formed therein an arcuate recess 18B in an upper edge portion 18C. The shaft 2B may be temporarily rested against the support 18 during installation with the guide groove 2Ba received in the recess 18B (as indicated in phantom at 2' in FIG. 5). The shaft 2B may then be rolled along the support 18 to th epositoin where it is engaged with a drive mechanism through an electromagnetic clutch member 13A having a projection 20 which is received in a mating hole 2C formed on the end of the shaft 2B. The support 18 may be formed integrally with the frame 13, or it may be made of a different material and formed separately and fixed to the frame 13 with screws or bolts. A similar mounting structure may of course be provided at the other end of the shaft 2B.

A similar fixing device may be provided for the take-up roller 4.

Figure 2:
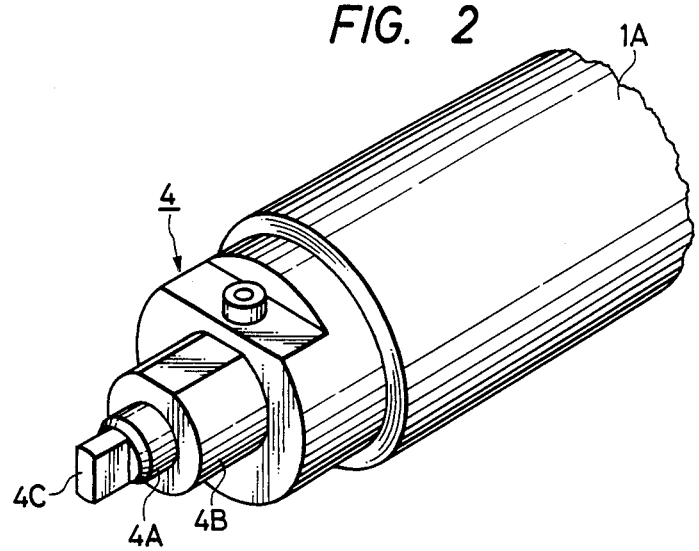
FIG. 2 is a partial perspective view of a take-up roller constructed in accordance with the present invention and used in the apparatus of FIG. 1.
Figure 3:
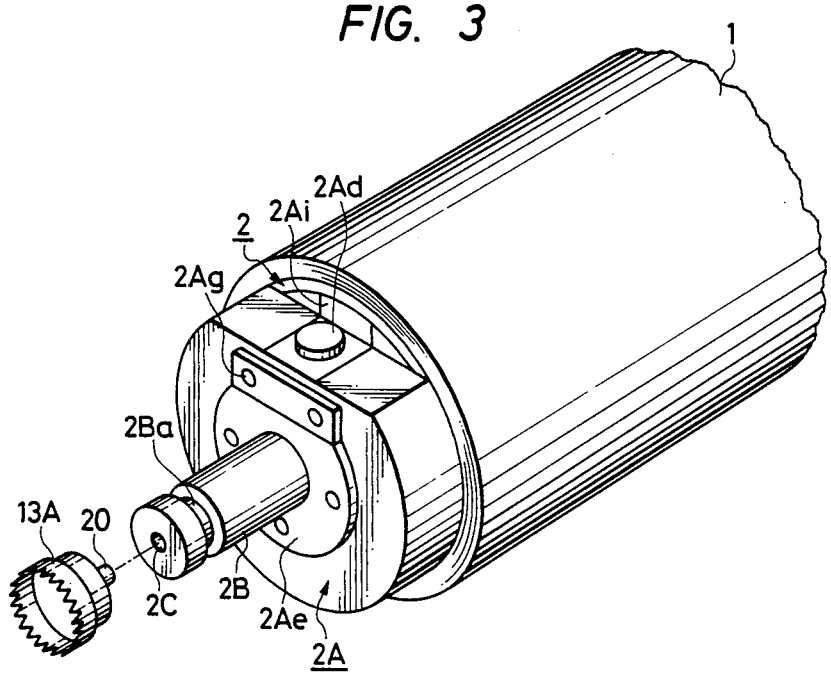
FIG. 3 is a partial perspective view of a supply roller constructed in accordance with the present invention and used in the apparatus of FIG. 1.
Figure 4:
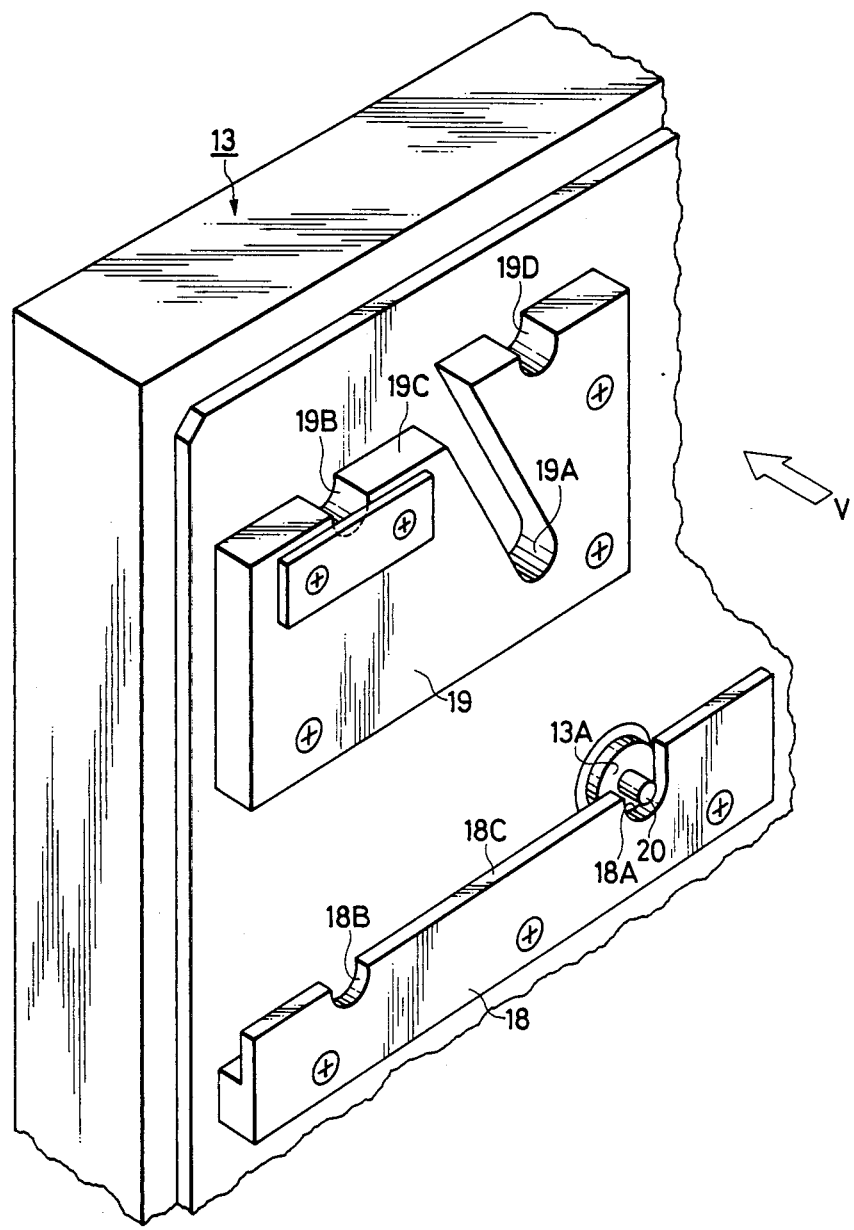
FIG. 4 is a partial perspective view of supports for the supply and take-up rollers of FIGS. 2 and 3.
Figure 5:
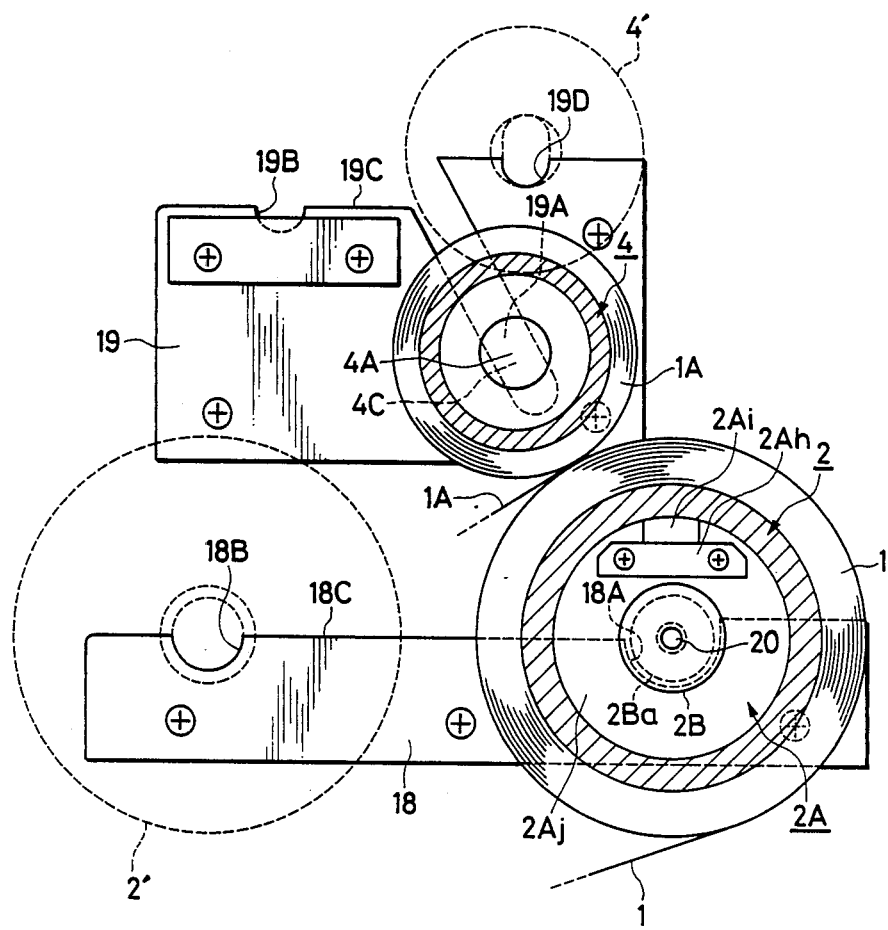
FIG. 5 is a sectional view showing the winding and take-up rollers of FIGS. 2 and 3 received in the supports of FIG. 4.

As shown in FIG. 2, the end of the shaft 4B of the take-up roller 4 has a reduced diameter portion 4A and a generally rectangular projection 4C. As seen best in FIGS. 4 and 5, a support 19 is also provided for temporarily supporting the take-up roller 4 during installation. The support 19 has an arcuate recess 19B for temporarily receiving the shaft 4B before it is slid into an elongated slot 19C. Also, a second arcuate recess 19D is provided at a position above and to the rear of the slot 19C for temporarily receiving the shaft 4B when the take-up roller has been filled and is being removed for disposal. As in the case of the support 18, the support 19 can be formed integrally with the frame 13, or it may be made of a different material and formed separately and fixed to the frame 13 with screws or bolts. As in the previously described case, a similar mounting structure may be provided at the other end of the shaft 4B.

This completes the description of the preferred embodiments of the invention. Although preferred embodiments have been described, it is believed that numerous alterations and modifications thereto would be apparent to one of ordinary skill in the art without departing from the spirit and scope of the invention.

What is claimed is:

1. A device for fixing a roller to a rotary shaft, comprising: a support member having a first hole through which said shaft passes, a press member, said support member and said press member being dimensioned so that when assembled together they are received in a hollow end portion of said roller, a screw threadedly fitted to said press member and passing through a second hole in said support member extending orthogonal to said first hole and into a recess formed around said shaft, a sleeve received in said recess and positioned around said shaft, said sleeve having an inner diameter larger than an outer diameter of said shaft where said shaft passes through said sleeve and an outer diameter less than an inner diameter of said recess, and a first guide plate fixed to an outer end of said support member and second guide plate fixed to an inner end of said support member for guiding said press member, wherein, when said screw is tightened, said support member and said press member are moved apart to firmly engage an inner surface of said roller in said hollow end portion while simultaneously an end of said screw engages said shaft through said sleeve.

2. The device for fixing a roller to a rotary shaft of claim 1, wherein said press member has a radially extending portion engaging said roller and a recessed portion where said screw is located.

3. The device for fixing a roller to a rotary shaft of claim 2, wherein a head of said screw is below a level of said roller when said screw is tightened to fix said roller to said shaft.

4. The device for fixing a roller to a rotary shaft of claim 1, wherein said screw is a manually rotatable screw.

5. The device for fixing a roller to a rotary shaft of claim 4, wherein said press member and said support member are made of a resin.

6. The device for fixing a roller to a rotary shaft of claim 4, wherein said press member and said support member are made of aluminum.

7. The device for fixing a roller to a rotary shaft of claim 4, wherein said sleeve and said screw are made of a material selected from the group consisting of steel and steel alloys.

8. A take-up roller for a laminator apparatus, comprising: a cylindrical roller, a support member having a first hole through which said shaft passes, a press member, said support member and said press member being dimensioned so that when assembled together they are received in a hollow end portion of said roller, a screw threadedly fitted to said press member and passing through a second hole in said support member extending orthogonal to said first hole and into a recess formed around said shaft, a sleeve received in said recess and positioned around said shaft, said sleeve having an inner diameter larger than an outer diameter of said shaft where said shaft passes through said sleeve and an outer diameter less than an inner diameter of said recess, and a first guide plate fixed to an outer end of said support member and a second guide plate fixed to an inner end of said support member for guiding said press member, wherein, when said screw is tightened, said support member and said press member are moved apart to firmly engage an inner surface of said roller in said hollow end portion while simultaneously an end of said screw engages said shaft through said shaft.

9. The take-up roller of claim 8, wherein said press member has a radially extending portion engaging said roller and a recessed portion where said screw is located.

10. The take-up roller of claim 9, wherein a head of said screw is below a level of said roller when said screw is tightened to fix said roller to said shaft.

11. The take-up roller of claim 8, wherein said screw is a manually rotatable screw.

12. The take-up roller of claim 8, wherein said press member and said support member are made of a resin.

13. The take-up roller of claim 8, wherein said press member and said support member are made of aluminum.

14. The take-up roller of claim 8, wherein said sleeve and said screw are made of a material selected from the group consisting of steel and steel alloys.

15. The take-up roller of claim 8, wherein said roller is a hollow cylindrical member.

16. The take-up roller of claim 8, wherein said roller is a solid cylindrical member having hollow end portions.

17. A supply roller for a laminator apparatus, comprising: a cylindrical roller, a support member having a first hole through which said shaft passes, a press member, said support member and said press member being dimensioned so that when assembled together they are received in a hollow end portion of said roller, a screw threadedly fitted to said press member and passing through a second hole in said support member extending orthogonal to said first hole and into a recess formed around said shaft, a sleeve received in said recess and positioned around said shaft, said sleeve having an inner diameter larger than an outer diameter of said shaft where said shaft passes through said sleeve and an outer diameter less than an inner diameter of said recess, and a first guide plate fixed to an outer end of said support member and a second guide plate fixed to an inner end of said support member for guiding said press member, wherein, when said screw is tightened, said support member and said press member are moved apart to firmly engage an inner surface of said roller in said hollow end portion while simultaneously an end of said screw engages said shaft through said shaft.

18. The supply roller of claim 17, wherein said press member has a radially extending portion engaging said roller and a recessed portion where said screw is located.

19. The supply roller of claim 18, wherein a head of said screw is below a level of said roller when said screw is tightened to fix said roller to said shaft.

20. The supply roller of claim 17, wherein said screw is a manually rotatable screw.

21. The supply roller of claim 17, wherein said press member and said support member are made of a resin.

22. The supply roller of claim 17, wherein said press member and said support member are made of aluminum.

23. The supply roller of claim 17, wherein said sleeve and said screw are made of a material selected from the group consisting of steel and steel alloys.

24. The supply roller of claim 17, wherein said roller is a hollow cylindrical member.

25. The supply roller of claim 17, wherein said roller is a solid cylindrical member having hollow end portions.

* * * * *